(12) United States Patent
Bodey, Jr. et al.

(10) Patent No.: US 10,093,149 B2
(45) Date of Patent: Oct. 9, 2018

(54) VEHICLE BODY WITH HVAC UNIT

(71) Applicant: Ford Global Technologies, LLC, Dearborn, MI (US)

(72) Inventors: Richard Allen Bodey, Jr., Ypsilanti, MI (US); Michael James Freeman, Allen Park, MI (US); Kevin Brohl, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/408,607

(22) Filed: Jan. 18, 2017

(65) Prior Publication Data

US 2018/0201091 A1 Jul. 19, 2018

(51) Int. Cl.
| | |
|---|---|
| *B60H 1/00* | (2006.01) |
| *B62D 25/04* | (2006.01) |
| *B62D 25/16* | (2006.01) |
| *B62D 25/20* | (2006.01) |
| *B62D 43/10* | (2006.01) |
| *B62D 27/02* | (2006.01) |

(52) U.S. Cl.
CPC ..... *B60H 1/00535* (2013.01); *B60H 1/00542* (2013.01); *B62D 25/04* (2013.01); *B62D 25/16* (2013.01); *B62D 25/2027* (2013.01); *B62D 27/02* (2013.01); *B62D 43/10* (2013.01)

(58) Field of Classification Search
CPC ........... B60H 1/00535; B60H 1/00542; B60H 1/243; B60H 1/244; B60H 1/246; B62D 25/04; B62D 25/16; B62D 25/2027; B62D 25/2036

USPC ..... 296/208, 190.09, 203.04, 193.05, 193.06
See application file for complete search history.

(56) References Cited

U.S. PATENT DOCUMENTS

| | | | | |
|---|---|---|---|---|
| 5,709,601 A | * | 1/1998 | Heck | B60H 1/00028 296/70 |
| 6,110,037 A | * | 8/2000 | Yoshinaka | B60H 1/0055 454/143 |
| 6,409,590 B1 | * | 6/2002 | Suzuki | B60H 1/0055 454/143 |
| 6,520,849 B1 | * | 2/2003 | Greenwald | B60H 1/0055 296/208 |
| 6,620,039 B1 | * | 9/2003 | Tao | B60H 1/00378 454/139 |
| 8,128,161 B2 | | 3/2012 | Yang et al. | |
| 2007/0075567 A1 | * | 4/2007 | Hoppen | B60H 1/00535 296/192 |
| 2007/0123157 A1 | * | 5/2007 | Shah | B60H 1/0055 454/121 |

(Continued)

FOREIGN PATENT DOCUMENTS

| | | |
|---|---|---|
| CN | 104629398 A | 5/2015 |
| JP | 200656451 A | 3/2006 |
| JP | 201551657 A | 3/2015 |

*Primary Examiner* — Gregory A Blankenship
(74) *Attorney, Agent, or Firm* — Jason C. Rogers; Bejin Bieneman PLC

(57) ABSTRACT

A vehicle includes a vehicle body and an HVAC unit. The vehicle body has a first structure and a second structure that define a gap. The HVAC unit is fixed to the vehicle body and includes a motor and a case housing the motor. The case is disposed in the gap, abuts the first structure and the second structure, and reinforces the vehicle body between the first structure and the second structure.

20 Claims, 5 Drawing Sheets

(56) References Cited

U.S. PATENT DOCUMENTS

| | | | |
|---|---|---|---|
| 2011/0074184 A1* | 3/2011 | Hashikawa | B60H 1/00564 296/208 |
| 2013/0146248 A1 | 6/2013 | Kim et al. | |
| 2014/0158319 A1* | 6/2014 | Ju | B60H 1/00021 165/42 |
| 2014/0174582 A1* | 6/2014 | Kehimkar | B60H 1/00528 138/106 |
| 2014/0230482 A1 | 8/2014 | Gruenberg et al. | |
| 2018/0134114 A1* | 5/2018 | Eckelberg | B60H 1/00535 |
| 2018/0134121 A1* | 5/2018 | Freeman | B60H 1/243 |

\* cited by examiner

VEHICLE BODY WITH HVAC UNIT

BACKGROUND

A climate-control system provides heating and/or cooling to a passenger compartment of a vehicle. The climate-control system may operate to cool the passenger compartment by transporting a refrigerant through a heat cycle to absorb heat from the passenger compartment and expel the heat from the vehicle, combined with fans, blowers, and ducts to move air between the passenger compartment and the climate-control system. The climate-control system may operate as a radiator for an engine of the vehicle to heat the passenger compartment by transferring some waste heat from the engine into the passenger compartment.

DETAILED DESCRIPTION

Figure 1:
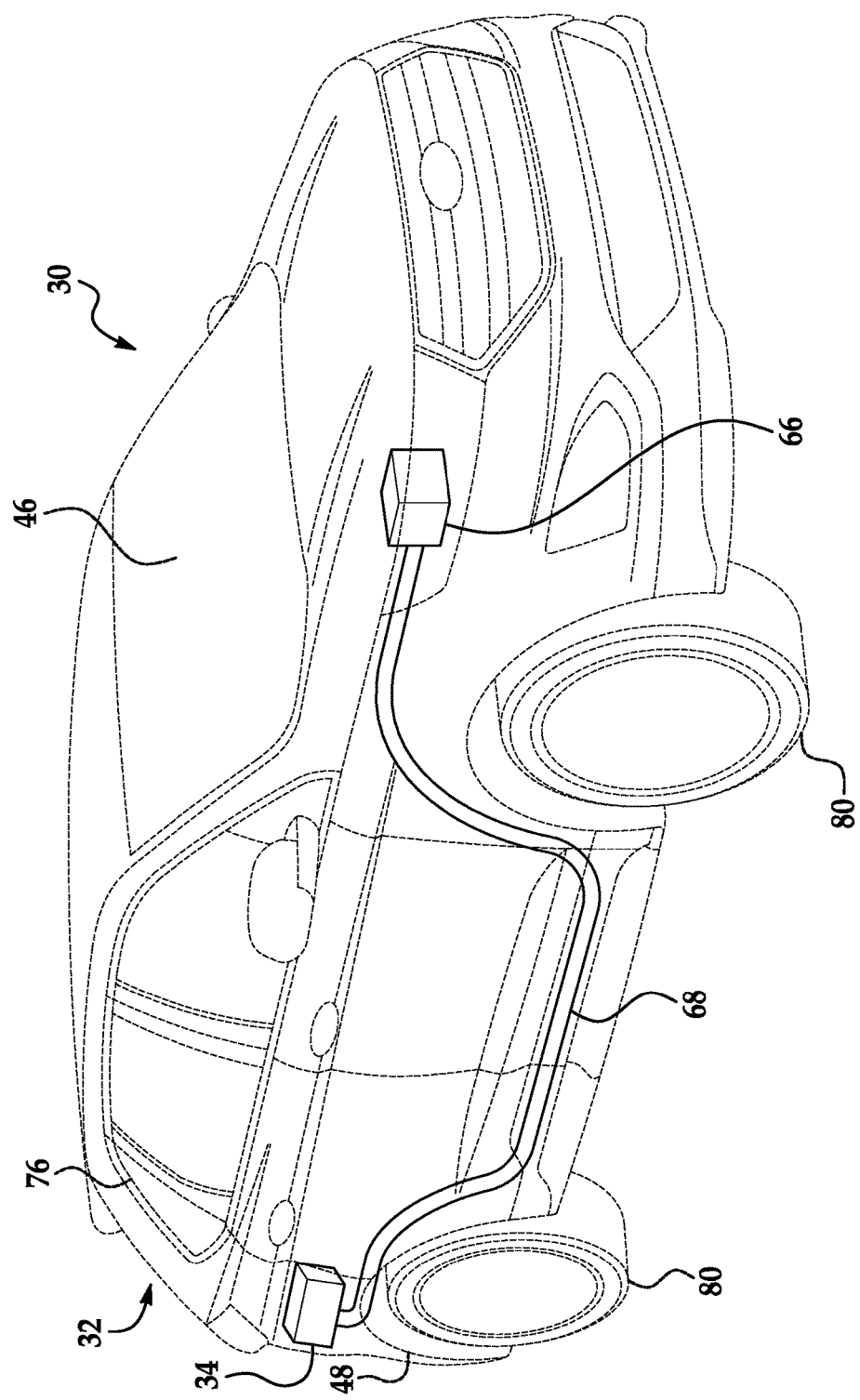
FIG. 1 is a perspective view of a vehicle including a primary HVAC unit and an auxiliary HVAC unit.

With reference to the Figures, wherein like numerals indicate like parts throughout the several views, a vehicle 30 includes a vehicle body 32 and a heating, ventilation, and/or air-conditioning (HVAC) unit 34. The vehicle body 32 has a first structure 36a, 36b and a second structure 38a, 38b that define a gap 40a, 40b. (The adjectives "first" and "second" are used throughout this document as identifiers and are not intended to signify importance or order.) The HVAC unit 34 is fixed to the vehicle body 32 and includes a motor 42 and a case 44 housing the motor 42. The case 44 is disposed in the gap 40a, 40b, abuts the first structure 36a, 36b and the second structure 38a, 38b, and reinforces the vehicle body 32 between the first structure 36a, 36b and the second structure 38a, 38b.

The case 44 reinforces the vehicle body 32. Specifically, the case 44 may transfer forces between the first structure 36a, 36b and the second structure 38a, 38b across the gap 40a, 40b, i.e., provides an additional load path to reinforce the vehicle body 32 at the gap 40a, 40b. The case 44 thus strengthens the vehicle body 32 while still allowing the gap 40a, 40b to be sufficiently large to accommodate the HVAC unit 34, which may increase the comfort of occupants of the vehicle 30. For example, the case 44 may increase the torsional stiffness of the vehicle body 32.

Figure 2:
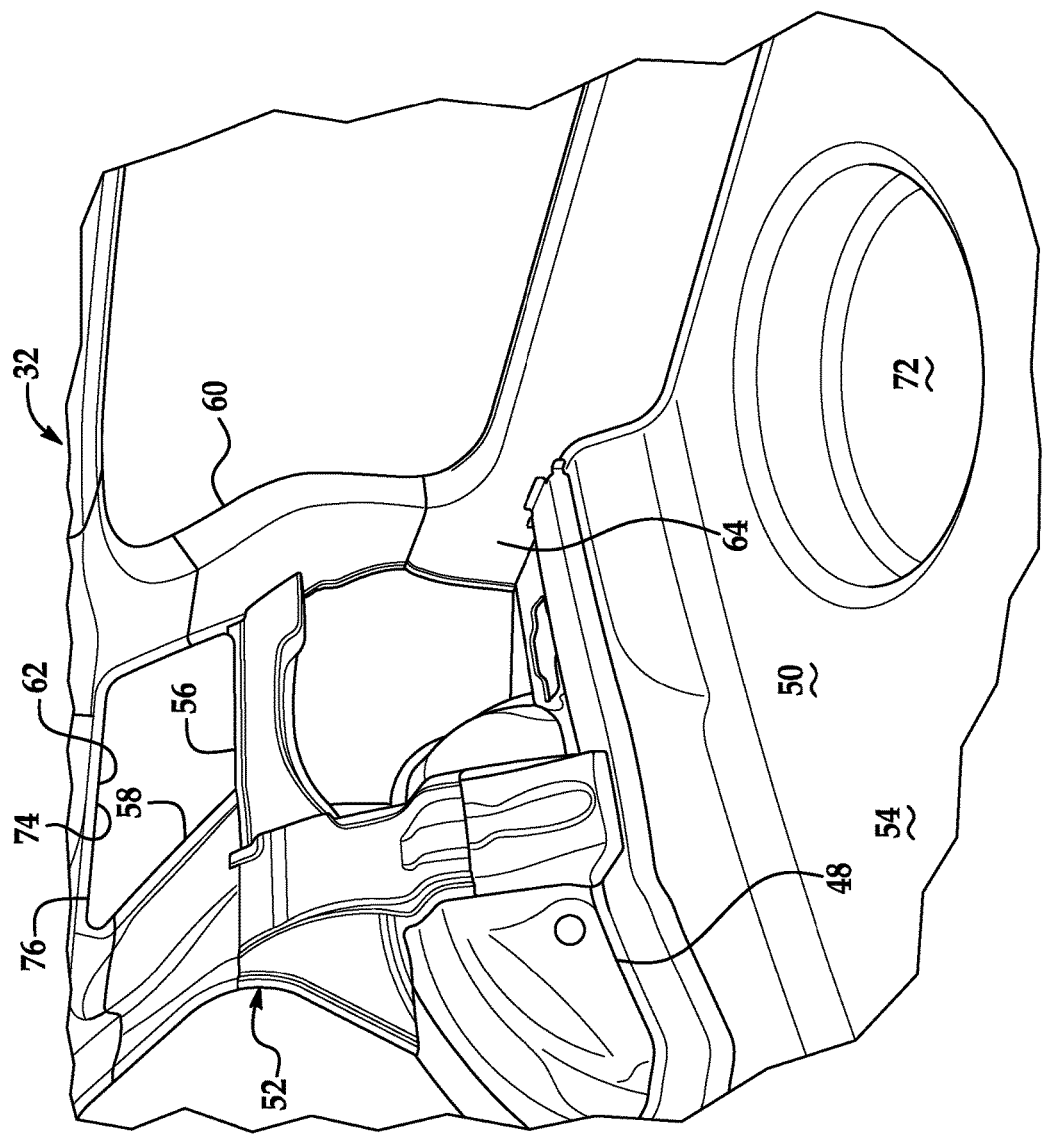
FIG. 2 is an inside perspective view of a rear portion of the vehicle body with an HVAC unit omitted for illustration.
Figure 3:
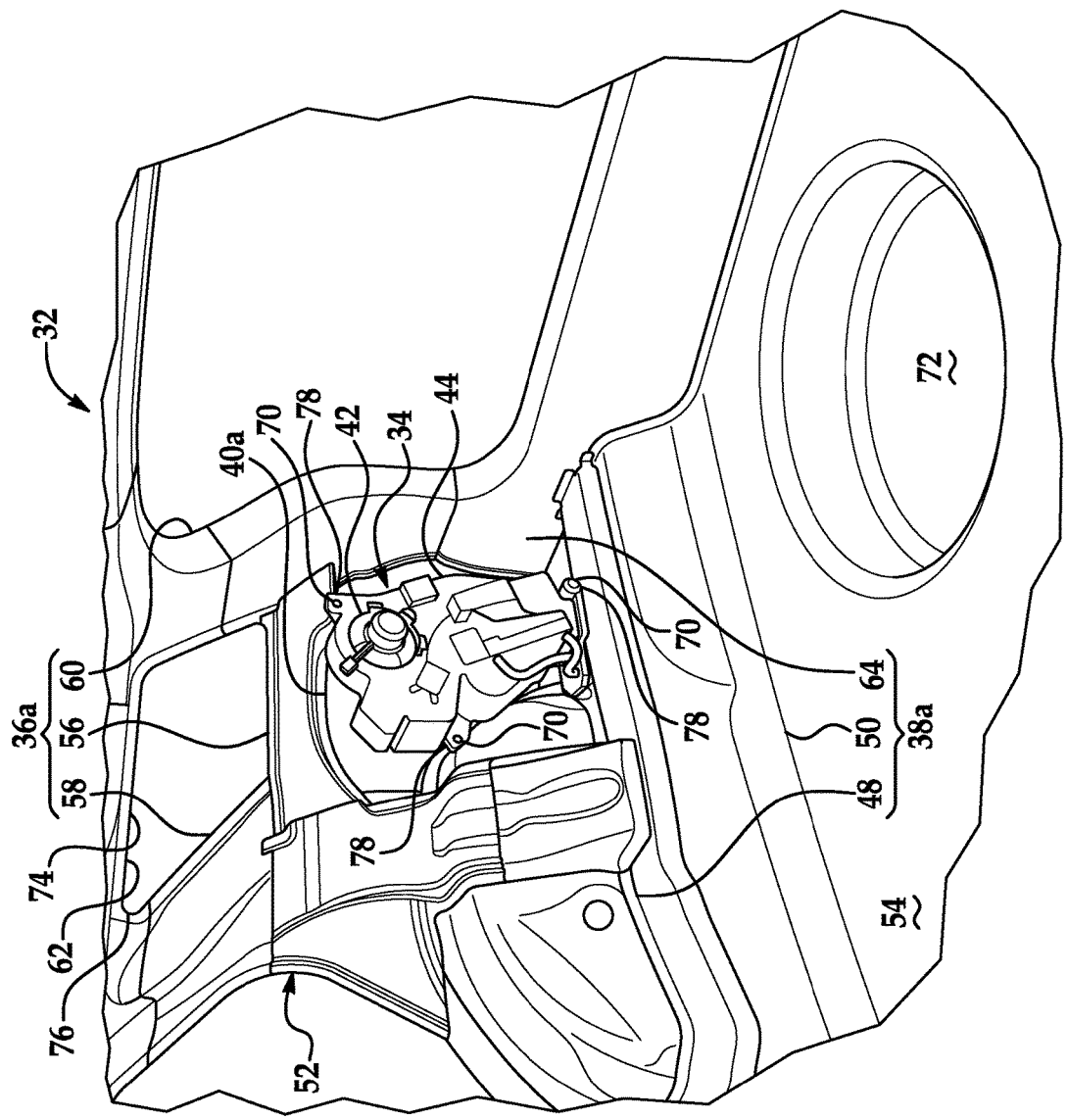
FIG. 3 is an inside perspective view of a rear portion of the vehicle body including a first embodiment of the HVAC unit.
Figure 4:
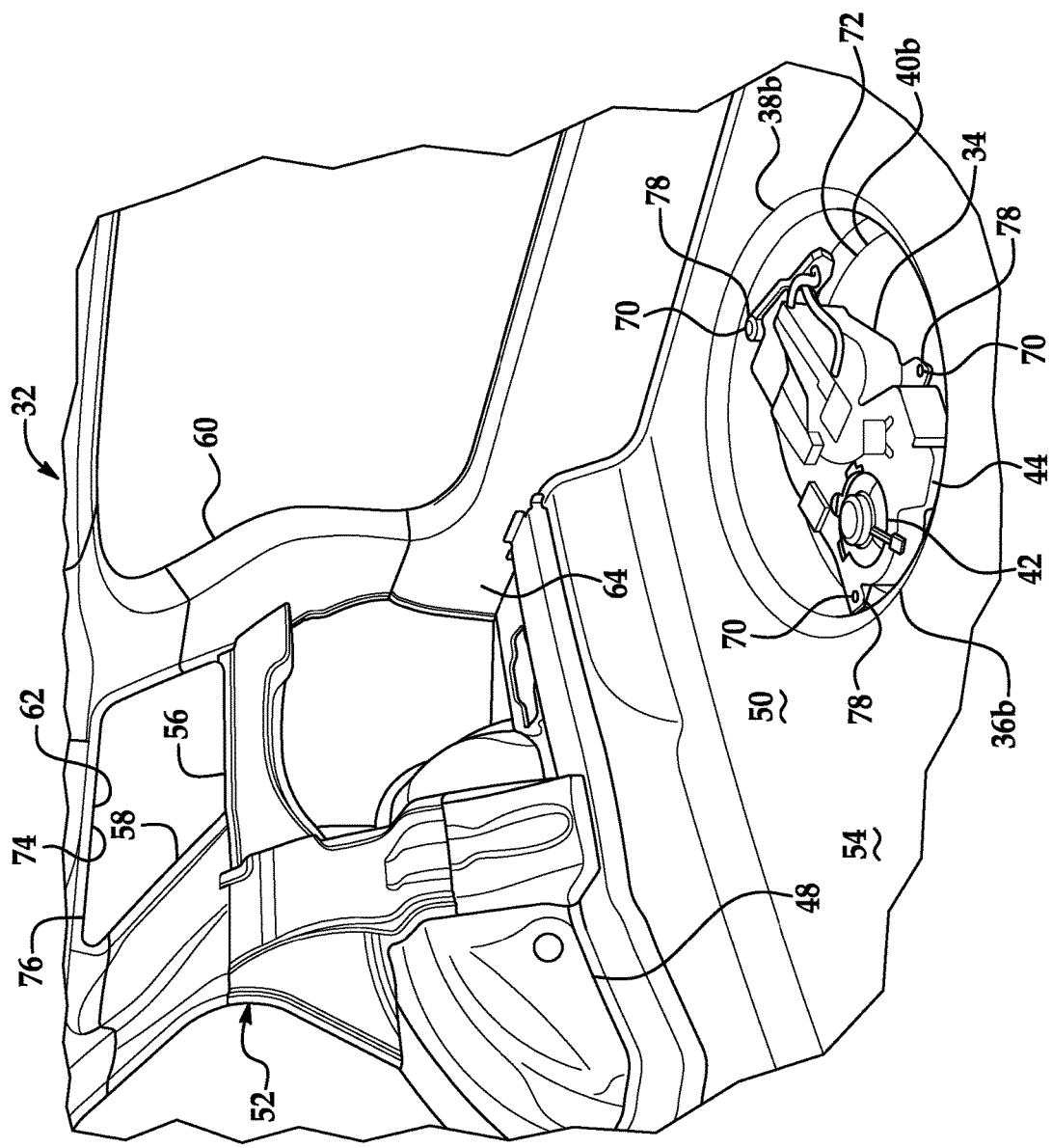
FIG. 4 is an inside perspective view of a rear portion of the vehicle body including a second embodiment of the HVAC unit.

With reference to FIGS. 2-4, the vehicle body 32 may be of a unibody construction. In the unibody construction, the vehicle body 32 serves as a frame, and the vehicle body 32, including rockers, pillars, and roof rails 62, is unitary, i.e., a continuous one-piece unit. As another example, the vehicle body 32 may be a component in a body-on-frame construction (also referred to as a cab-on-frame construction). In other words, the vehicle body 32 and a frame (not shown) are separate components, i.e., are modular, and the vehicle body 32 is supported on and affixed to the frame. Alternatively, the vehicle body 32 and the frame may have any suitable construction. The vehicle body 32 and/or the frame may be formed of any suitable material, for example, steel, aluminum, etc.

The vehicle 30 includes a passenger compartment 46 to house occupants, if any, of the vehicle 30. The passenger compartment 46 includes one or more front seats (not shown) disposed at a front of the passenger cabin and one or more back seats (not shown) disposed behind the front seats. The passenger cabin may also include third-row seats (not shown) at a rear of the passenger cabin. The vehicle body 32 may define the passenger compartment 46; in other words, the vehicle body 32 divides a space inside the vehicle 30 from a space outside the vehicle 30, and the passenger compartment 46 is located within the space inside the vehicle 30. The passenger compartment 46 may include trim (not shown) covering the vehicle body 32 and the case 44 relative to the space inside the vehicle 30. The trim may be formed of any suitable nonstructural material, e.g., polypropylene.

With reference to FIG. 2, the vehicle body 32 may include two rear wheel wells 48. Each rear wheel well 48 is a curved portion of the vehicle body 32 that is sized to accommodate a wheel 80 on the exterior of the vehicle 30. The rear wheel well 48 may connect to a floor 50 and to one of two vehicle sides 52, i.e., side body panels.

The vehicle body 32 includes the floor 50. The floor 50 may extend between the vehicle sides 52 and/or between the rear wheel wells 48. The floor 50 may be adjacent the rear wheel wells 48 and/or the vehicle sides 52; that is, nothing is between the floor 50 and the rear wheel wells 48 and/or between the floor 50 and the vehicle sides 52. The floor 50 may, e.g., supports items placed in a trunk 54 of the vehicle 30.

With continued reference to FIG. 2, the floor 50 may include a spare-tire well 72. The spare-tire well 72 may be sized to accommodate a spare tire (not shown) in the interior of the vehicle. The spare-tire well 72 may be spaced from edges of the floor 50, that is, from the vehicle sides 52 and from the rear wheel wells 48.

With reference to FIGS. 1 and 2, the vehicle body 32 may include the two vehicle sides 52. Each vehicle side 52 may include, among other components, a horizontal member 56, a first pillar 58, a second pillar 60, and the roof rail 62.

The first pillar 58 may connect to the rear wheel well 48 and extend in a vehicle-upward direction from the rear wheel well 48 to the roof rail 62. The first pillar 58 may be referred to as a "C-pillar," i.e., is the third pillar from a front of the vehicle 30.

The second pillar 60 may be spaced from the first pillar 58. The second pillar 60 may connect to the floor 50 at a vehicle rear corner 64. The second pillar 60 may extend in a vehicle-upward direction from the floor 50 to the roof rail 62. The second pillar 60 may be referred to as a "D-pillar," i.e., is the fourth pillar from the front of the vehicle 30. Alternatively, the first pillar 58 and the second pillar 60 may be any suitable pillar of the vehicle body 32.

The horizontal member 56 may extend from the second pillar 60 to the first pillar 58 in a vehicle-forward direction. The first pillar 58 and the second pillar 60 may extend in a vehicle-upward direction from the horizontal member 56. The roof rail 62 may extend in a vehicle-forward direction from the second pillar 60 to the first pillar 58 and may extend farther in a vehicle-forward direction from the first pillar 58.

The first pillar 58, the second pillar 60, the horizontal member 56, and the roof rail 62 define an opening 74, and a quarter glass 76 is disposed in the opening 74. The horizontal member 56 may be generally horizontal and may deviate slightly from horizontal. Specifically, the horizontal member 56 is the lower boundary of the quarter glass 76.

With reference to FIG. 1, a second HVAC unit 66 may be fixed relative to the vehicle body 32 and spaced from the HVAC unit 34. For example, the second HVAC unit 66 may be a primary HVAC unit, and the HVAC unit 34 may be an auxiliary HVAC unit. The second HVAC unit 66 and the HVAC unit 34 may each have their own heat exchangers (not shown), providing heating, cooling, ventilation, or a combination of heating, cooling, and ventilation. Alternatively, the second HVAC unit 66 may be connected to the HVAC unit 34 via a duct 68 allowing air to flow from the second HVAC unit 66 to the HVAC unit 34.

With reference to FIGS. 1, 3, and 4, the HVAC unit 34 may be fixed to the vehicle body 32. For example, the HVAC unit 34 may be disposed in the passenger compartment 46. The HVAC unit 34 may include the motor 42, a heater, a cooler (both not shown), and the case 44 housing the motor 42, heater, and cooler. The HVAC unit 34 may include only one of the heater and cooler. The motor 42 may, e.g., intake air from a source inside the vehicle 30, e.g., the passenger compartment 46, to heat or cool and then pump the air back into the passenger compartment 46. The motor 42 may be, e.g., an electric motor. Alternatively or additionally, the HVAC unit 34 may draw in air through the duct 68. Alternatively, the HVAC unit 34 may include only the motor 42 and not the heater and cooler, relying on the second HVAC unit 66 to treat air pumped through the duct 68.

The case 44 may be formed of rigid material. The case 44 may be formed of material that is sufficiently strong for structural purposes in the vehicle body 32. For example, the case 44 may be formed of fiber-reinforced material and/or moldable polymer such as carbon fiber, fiberglass, etc.; or of a metal such as steel, aluminum, etc. The material forming the case 44 may have a high Young's modulus, such as a Young's modulus greater than $8 \times 10^6$ pounds per square inch (psi) and up to or above $30 \times 10^6$ psi. For example, the material forming the case 44 may have a higher Young's modulus than the trim covering the vehicle body 32.

The vehicle body 32 has the first structure 36a, 36b and the second structure 38a, 38b defining the gap 40a, 40b. The gap 40a, 40b is open between components of the vehicle body 32. The first structure 36a, 36b includes components of the vehicle body 32 on one side of the gap 40a, 40b, and the second structure 38a, 38b includes components of the vehicle body 32 on an opposite side of the gap 40a, 40b. The first structure 36a, 36b may partially extend around the gap 40a, 40b, and the second structure 38a, 38b may extend around a remainder of the gap 40a, 40b.

With continued reference to FIGS. 3 and 4, the case 44 is disposed in the gap 40a, 40b. The case 44 may abut the first structure 36a, 36b and the second structure 38a, 38b. The case 44 may extend across the gap 40a, 40b from the first structure 36a, 36b to the second structure 38a, 38b. The case 44 may partially or completely fill the gap 40a, 40b.

The case 44 may be fixedly attached to the vehicle body 32. The case 44 may be attached so that forces transfer from the vehicle body 32 to the case 44 and from the case 44 to the vehicle body 32. For example, the case 44 may be fixed to the vehicle body 32 with a fastener 78. Specifically, the case 44 may be fixed to at least three locations 70 on the vehicle body 32, including, for example, at least one location 70 on the first structure 36a, 36b and at least one location 70 on the second structure 38a, 38b. The fastener 78 may be a threaded fastener, such as a bolt, or may be any suitable type of fastener.

Figure 5:
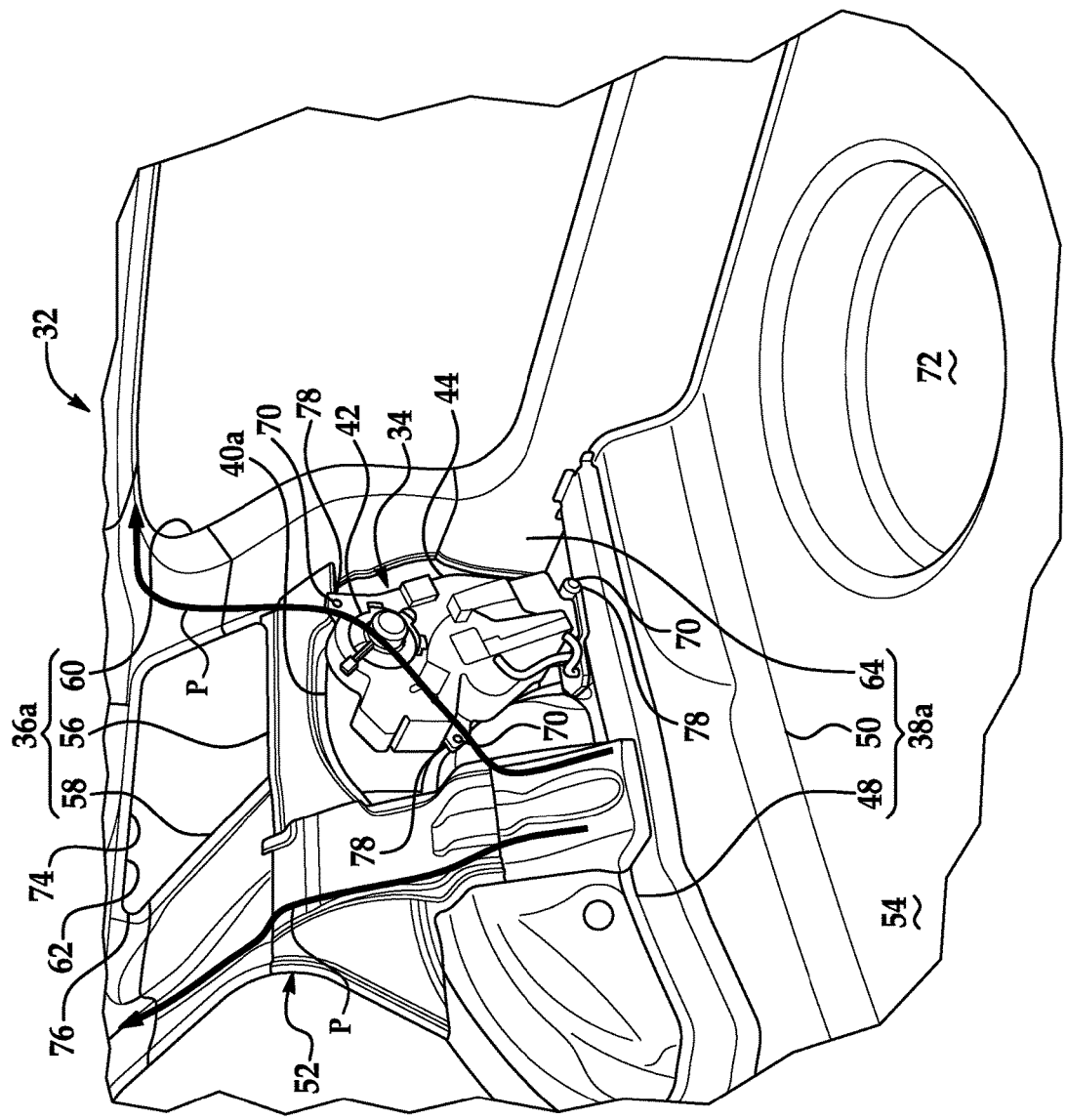
FIG. 5 is an inside perspective view of a rear portion of the vehicle body including the first embodiment of the HVAC unit and showing customer-usage load paths through the vehicle body.

With reference to FIG. 5, the case 44 reinforces the vehicle body 32 between the first structure 36a, 36b and the second structure 38a, 38b. In other words, the case 44 provides a path for forces to transfer from the first structure 36a, 36b to the second structure 38a, 38b and vice versa. For example, during operation of the vehicle 30, the vehicle body 32 is subject to a variety of forces, such as impact loads from, e.g., potholes or bumps; bending or torsional moments; centrifugal forces during turns; crushing forces during a rollover; etc. For example, FIG. 5 illustrates two load paths P from, e.g., the vehicle 30 running over a bump, with one load path P passing through the rear wheel well 48 and the first pillar 58 and the other load path P passing through the rear wheel well 48, the case 44, and the second pillar 60.

With reference to FIG. 3, in a first embodiment of the vehicle 30, the first structure 36a is above the second structure 38a, i.e., the first structure 36a is an upper structure and the second structure 38a is a lower structure. The second structure 38a includes at least the rear wheel well 48, and the first structure 36a includes at least the horizontal member 56. The second structure 38a may further include the floor 50 and the vehicle rear corner 64. The first structure 36a may further include the first pillar 58 and the second pillar 60. The horizontal member 56, the rear wheel well 48, and the floor 50 may define the gap 40a. Specifically, the gap 40a may be a space circumscribed by the rear wheel well 48, the floor 50, the vehicle rear corner 64, the second pillar 60, the horizontal member 56, and the first pillar 58. The case 44 is disposed in the gap 40a; for example, the case 44 may be disposed between the rear wheel well 48 and the vehicle rear corner 64, and/or may be disposed between the floor 50 and the horizontal member 56.

In the first embodiment, the case 44 may be bolted to at least three locations 70 spaced among the rear wheel well 48, the floor 50, the vehicle rear corner 64, the second pillar 60, the horizontal member 56, and the first pillar 58. For example, the case 44 may be bolted to the floor 50, to the horizontal member 56, and to the rear wheel well 48.

In the first embodiment, the case 44 provides a path for forces to transfer from the second structure 38a to the first structure 36a and vice versa. For example, a force may transfer from the rear wheel well 48 to the case 44 to the horizontal member 56 and the first pillar 58. For another example, a force may transfer from the vehicle rear corner 64 through the case 44 to the second pillar 60. The case 44 thus reinforces the vehicle body 32 by providing paths for forces across the gap 40a rather than only around the gap 40a.

With reference to FIG. 4, in a second embodiment of the vehicle 30, the first and second structures 36b, 38b define the spare-tire well 72 in the floor 50. For example, the first structure 36b may be a vehicle-forward half of the spare-tire well 72, the second structure 38b may be a vehicle-rearward half of the spare-tire well 72, and the gap 40b may be the spare-tire well 72. The case 44 is disposed in the spare-tire well 72. The case 44 may be bolted to at least three locations 70 spaced around a periphery of the spare-tire well 72. The case 44 extends across the spare-tire well 72 from the second structure 38b to the first structure 36b. The case 44 reinforces the vehicle body 32 by providing paths for forces across the spare-tire well 72 rather than only around the spare-tire well 72.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
    a vehicle body having a first structure and a second structure defining a gap; and
    an HVAC unit fixed to the vehicle body and including a motor and a case housing the motor;
    the case being disposed in the gap, abutting the first structure and the second structure, and reinforcing the vehicle body between the first structure and the second structure.

2. The vehicle of claim 1, wherein the case is formed of fiber-reinforced material.

3. The vehicle of claim 1, wherein the vehicle body defines a passenger compartment, and the HVAC unit is disposed in the passenger compartment.

4. The vehicle of claim 1, wherein the case is fastened to the vehicle body with a fastener.

5. The vehicle of claim 4, wherein the case is fastened to at least three locations on the vehicle body.

6. The vehicle of claim 5, wherein the at least three locations include at least one location on the first structure and at least one location on the second structure.

7. The vehicle of claim 1, wherein the second structure includes a rear wheel well.

8. The vehicle of claim 7, wherein the second structure includes a floor adjacent the rear wheel well.

9. The vehicle of claim 8, wherein the first structure includes a member, and wherein the member, the rear wheel well, and the floor define the gap.

10. The vehicle of claim 9, further comprising a pillar extending in a vehicle-upward direction from the member.

11. The vehicle of claim 10, further comprising a second pillar extending in a vehicle-upward direction from the member and spaced from the pillar.

12. The vehicle of claim 9, wherein the case is fastened to the floor with a fastener.

13. The vehicle of claim 12, wherein the case is fastened to the member.

14. The vehicle of claim 13, wherein the case is fastened to the rear wheel well.

15. The vehicle of claim 1, wherein the second structure includes a rear wheel well and a vehicle rear corner.

16. The vehicle of claim 15, wherein the case is disposed between the rear wheel well and the vehicle rear corner.

17. The vehicle of claim 1, wherein the vehicle body includes a floor, and the first and second structures define a spare tire well in the floor.

18. The vehicle of claim 17, wherein the spare tire well is spaced from edges of the floor.

19. The vehicle of claim 18, wherein the case is disposed in the spare tire well.

20. The vehicle of claim 1, further comprising a second HVAC unit fixed relative to the vehicle body and spaced from the HVAC unit.

* * * * *